United States Patent
Ikai et al.

(10) Patent No.: US 11,117,223 B2
(45) Date of Patent: Sep. 14, 2021

(54) WIRE FOR GAS-SHIELDED ARC WELDING

(71) Applicant: KOBE STEEL, LTD., Kobe (JP)

(72) Inventors: Kazuya Ikai, Kanagawa (JP); Hikaru Kinashi, Kanagawa (JP); Yasuyuki Yokota, Kanagawa (JP)

(73) Assignee: KOBE STEEL, LTD., Kobe (JP)

( * ) Notice: Subject to any disclaimer, the term of this patent is extended or adjusted under 35 U.S.C. 154(b) by 0 days.

(21) Appl. No.: 16/882,398

(22) Filed: May 22, 2020

(65) Prior Publication Data

US 2021/0138591 A1    May 13, 2021

(30) Foreign Application Priority Data

Nov. 7, 2019 (JP) .............................. JP2019-202161
Dec. 27, 2019 (JP) .............................. JP2019-238958

(51) Int. Cl.
| | |
|---|---|
| *B23K 35/30* | (2006.01) |
| *B23K 35/02* | (2006.01) |
| *B23K 9/16* | (2006.01) |
| *B23K 101/32* | (2006.01) |
| *B23K 103/08* | (2006.01) |

(52) U.S. Cl.
CPC ............ *B23K 35/3026* (2013.01); *B23K 9/16* (2013.01); *B23K 35/0261* (2013.01); *B23K 2101/32* (2018.08); *B23K 2103/08* (2018.08)

(58) Field of Classification Search
CPC ............................ B23K 35/30; B23K 35/3053; B23K 35/0261; B23K 35/362; B23K 35/40; B23K 9/23; B23K 2103/04; B23K 35/0266; B23K 35/3073; B23K 35/368; B23K 9/173; B23K 2101/18; B23K 35/0255; B23K 35/304; B23K 35/3066; B23K 35/3086; B23K 9/025; B23K 9/18; B23K 35/0227;
(Continued)

(56) References Cited

U.S. PATENT DOCUMENTS

2018/0147674 A1*  5/2018  Okazaki ................ C22C 38/001

FOREIGN PATENT DOCUMENTS

| JP | 58-032598 | 2/1983 |
|---|---|---|
| JP | 62-124095 A | 6/1987 |

(Continued)

OTHER PUBLICATIONS

English translation of JP-2017148820-A (Year: 2017).*
(Continued)

*Primary Examiner* — Ibrahime A Abraham
*Assistant Examiner* — Chris Q Liu
(74) *Attorney, Agent, or Firm* — Oblon, McClelland, Maier & Neustadt, L.L.P.

(57) ABSTRACT

A wire for gas-shielded arc welding includes, based on a total mass of the wire: C: 0.01 mass % or more and 0.10 mass % or less, Si: 0.05 mass % or more and 0.55 mass % or less, Mn: 1.60 mass % or more and 2.40 mass % or less, Ti: 0.05 mass % or more and 0.25 mass % or less, Cu: 0.01 mass % or more and 0.30 mass % or less, S: 0.001 mass % or more and 0.020 mass % or less, N: 0.0045 mass % or more and 0.0150 mass % or less, Al: 0.10 mass % or less, and P: 0.025 mass % or less, with the remainder being Fe and inevitable impurities. In the wire, the following relationship is satisfied: $0.1 \leq [Ti]/[Si] \leq 3.0$, where [Si] is the content of Si (mass %) and [Ti] is the content of Ti (mass %).

8 Claims, 1 Drawing Sheet

(58) Field of Classification Search
CPC .................. B23K 35/3033; B23K 35/308;
B23K 9/0213; B23K 2101/06; B23K
2103/05; B23K 31/02; B23K 35/00;
B23K 35/004; B23K 35/22; B23K
35/302; B23K 35/3093; B23K 35/3602;
B23K 35/3607; B23K 35/3608; B23K
35/365; B23K 35/383; B23K 35/406;
B23K 37/0229; B23K 37/0241; B23K
9/02; B23K 9/0256; B23K 9/0284; B23K
9/073; B23K 9/12; B23K 9/16; B23K
9/167; B23K 9/1735; B23K 9/186; B23K
9/188; B23K 9/295
USPC .......... 219/119, 137 WM, 145.22, 146.22, 74
See application file for complete search history.

(56) References Cited

FOREIGN PATENT DOCUMENTS

| | | | | |
|---|---|---|---|---|
| JP | 63-157794 | 6/1988 | | |
| JP | 9-99390 | 4/1997 | | |
| JP | 2017148820 A | * | 8/2017 | ........... B23K 35/304 |

OTHER PUBLICATIONS

Written Opinion of the International Searching Authority dated Jun. 2, 2020 in International Application No. PCT/JP2020/009521 (with English translation), 5 pgs.
Extended European Search Report issued in corresponding European Application No. 20172394.7 dated Sep. 11, 2020.

* cited by examiner

WIRE FOR GAS-SHIELDED ARC WELDING

CROSS-REFERENCE TO RELATED APPLICATIONS

This application claims priority from Japanese Patent Application No. 2019-202161 filed on Nov. 7, 2019 and Japanese Patent Application No. 2019-238958 filed on Dec. 27, 2019, the entire subject matters of which are incorporated herein by reference.

BACKGROUND OF THE INVENTION

Technical Field

The present invention relates to a wire for gas-shielded arc welding.

Background Art

In recent years, technical developments relating to improvements in fuel efficiency of automobiles and the like have been actively promoted due to the increase of demand levels of environmental performances. Examples of a method of improving the fuel efficiency of the automobiles and the like include improvements of efficiency of an internal combustion engine, hybridization of an internal combustion engine, and electrification of an internal combustion engine. Since the weight of the vehicle body tends to be increased due to the mounting of a battery in the case of electrification, the development of a lightweight technology has been also advanced. For example, attempts of reducing the weight of a vehicle by using a thin steel sheet having a strength higher than a steel sheet in the related art to reduce the thickness of the vehicle have been actively promoted.

Since underbody parts are exposed to a corrosive environment due to salt damage contained in moisture or snow melting agents from a road surface, the local reduction in thickness of the steel sheet is a problem. Therefore, in order to realize a further reduction in the weight of the vehicle, there is also a need for a technology capable of preventing corrosion of the underbody parts as well as the need for underbody parts having sufficient strength and durability even when the thickness of the steel sheet is reduced.

In general, a method of electrodeposition coating after arc welding is adopted as a method of protecting underbody parts from a corrosive environment. However, when the electrodeposition coating is performed after the welding, an electrodeposition coating film is not formed on a weld slag, resulting in a coating defect, and a problem of corrosion progressing from this defect has occurred. Therefore, welding defects are prevented by increasing the thickness of the electrodeposition coating film, but the coating film may peel off together with a slag portion due to the force applied during traveling, and corrosion may be progressed from a part from which the coating film peels off, even if the coating film is formed on the slag.

In addition, regarding parts used in closer to a road surface and parts that are thinner among the underbody parts, a method of improving corrosion resistance based on a sacrificial anticorrosion effect of zinc by using a galvanized steel sheet, even when the coating film is peeled off is adopted as measures against the corrosion. However, zinc is vaporized in the weld portion by heat during arc welding, and thus the effect of improving the corrosion resistance in the weld bead cannot be sufficiently expected. Therefore, corrosion due to the poor coating on the welding slag may occur, or even when a coating film is formed, corrosion may occur due to the peeling of the slag during traveling.

Here, for example, Patent Literature 1 discloses a welding wire in which the contents of C, Si, and Mn are adjusted and a total content of one or two or more selected from Zr, Ti, and Al is adjusted to prevent degradation of durability of parts caused by not forming the coating film on a portion covered by the slag even when the electrodeposition coating is performed after welding. Patent Literature 1 discloses that the peeling property of the slag adhering to the weld portion after welding is excellent, and the slag can be easily peeled off. In recent years, a method of physically removing a slag after welding has been used for ensuring reliability, mainly for luxury cars.

CITATION LIST

Patent Literature

Patent Literature 1: JP S62-124095 A

BRIEF SUMMARY OF INVENTION

Technical Problem

However, when the wire described in Patent Literature 1 is used, the number of production steps is increased and the production cost is increased because of the addition of a slag removal step. Further, during the arc welding, there is a demand for a wire with less spatter generation in consideration of workability or the like.

Further, in a weld joint such as a lap fillet, stress is likely to be concentrated due to discontinuity in the shape, and when the reduction in thickness also occurs at the part, it becomes a factor of fatigue fracture. Therefore, a toe of weld bead is also required to be smooth.

The present invention has been made in view of the above-described situations, and an object of the present invention is to provide a wire for gas-shielded arc welding, by which the amount of spatter generated during welding is small, a step such as removal of the slag after welding is unnecessary, and a weld portion having excellent electrodeposition coatability and a good shape of the bead can be obtained.

Solution to Problem

As a result of intensive studies to solve the above problems, the present inventors have found that excellent electrodeposition coatability can be obtained without removing slag after welding, by uniformly forming a thin slag on a weld portion. Specifically, by adjusting the contents of Si and Ti in the wire and appropriately controlling the balance of components, it is possible to reduce the amount of spatter generated during welding, achieve a good shape of a bead, and uniformly form a thin slag having high adhesiveness in the weld portion. Since the thin slag is present, it is possible to prevent defects from being generated in the coating film formed by the electrodeposition coating on the weld portion. The present inventors have also found that the shape of the bead can be improved particularly by controlling the content of N among the components in the wire.

Although the mechanism by which a thin slag is uniformly formed after welding to form an electrodeposition coating film uniformly as a whole is not clear, it is presumed that the conductivity is different between the thin slag and the thick slag. In addition, the reason why the coating film peels off with the slag when an electrodeposition coating film with a large thickness is formed is presumed as follows: steps are formed on a surface of a part due to formation of the coating film on an uneven slag with a high peeling property, and the force is likely to be applied during the traveling.

The present invention has been made based on these findings.

The wire for gas-shielded arc welding in the present invention includes, based on a total mass of the wire:

C: 0.01 mass % or more and 0.10 mass % or less;
Si: 0.05 mass % or more and 0.55 mass % or less;
Mn: 1.60 mass % or more and 2.40 mass % or less;
Ti: 0.05 mass % or more and 0.25 mass % or less;
Cu: 0.01 mass % or more and 0.30 mass % or less;
S: 0.001 mass % or more and 0.020 mass % or less;
N: 0.0045 mass % or more and 0.0150 mass % or less;
Al: 0.10 mass % or less; and
P: 0.025 mass % or less, with the remainder being Fe and inevitable impurities, and the following relationship is satisfied:

$$0.1 \leq [Ti]/[Si] \leq 3.0$$

wherein [Si] is the content of Si (mass %) based on the total mass of the wire and [Ti] is the content of Ti (mass %) based on the total mass of the wire.

In one aspect of the wire for gas-shielded arc welding, the content of Si is preferably 0.25 mass % or less.

In one aspect of the wire for gas-shielded arc welding, the content of Ti is preferably 0.12 mass % or more.

In one aspect of the wire for gas-shielded arc welding, the wire preferably further includes at least one of Cr: 0.10 mass % or less and Mo: 0.10 mass % or less.

In one aspect of the wire for gas-shielded arc welding, the following relationship is preferably satisfied:

$$([Si]+[Ti]/3)/([C]/2+2\times[Al]) \geq 3$$

wherein [C] is the content of C (mass %) based on the total mass of the wire and [Al] is the content of Al (mass %) based on the total mass of the wire.

Advantageous Effects of Invention

In the present invention, it is possible to provide a wire for gas-shielded arc welding, by which the amount of spatter generated during welding is small, a step such as removal of the slag after welding is unnecessary, and a weld portion having excellent electrodeposition coatability and a good shape of the bead can be obtained.

DETAILED DESCRIPTION OF INVENTION

Figure 1:
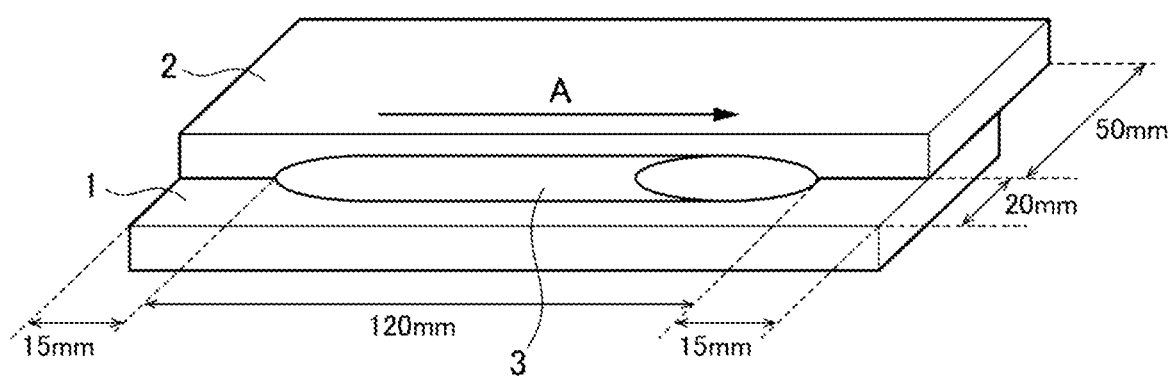
FIG. 1 is a perspective view showing conditions of gas-shielded arc welding.

Hereinafter, embodiments for carrying out the present invention are described in detail. It should be noted that the present invention is not limited to the embodiments described below, and can be optionally changed without departing from the scope of the present invention. Hereinafter, the reason for the addition and the reason for the numerical limitation of the components contained in a wire for gas-shielded arc welding in the present embodiment are described in detail. In the following description, the amount of each component in the wire is defined by the content thereof relative to the total mass of the wire.

<C: 0.01 Mass % or More and 0.10 Mass % or Less>

C is a component having a deoxidizing action and an effect of increasing strength of weld metal. Since one-pass welding is applied in welding of a thin sheet, there is no possibility that the strength is reduced unlike the case of multilayer welding that accompanies reheating, and strength equal to or higher than that of the base metal can be obtained.

If the content of C in the wire is less than 0.01 mass %, it is difficult to obtain a minimum strength required for a mild steel. Therefore, the content of C in the wire is 0.01 mass % or more, preferably 0.02 mass % or more, and more preferably 0.03 mass % or more, based on a total mass of the wire.

On the other hand, if the content of C in the wire is more than 0.10 mass %, the deoxidizing action is increased, and the viscosity of droplets is increased, and thus spatter is likely to occur due to a short circuit. In addition, CO is generated in a vicinity of an arc due to a combination of C and oxygen, and thus spatter is likely to occur due to the explosion, and fume emission increases. Accordingly, the content of C is preferably small, as long as it is within a range at which the desired strength of the weld metal can be obtained. Therefore, the content of C in the wire is 0.10 mass % or less, preferably 0.09 mass % or less, and more preferably 0.08 mass % or less, based on the total mass of the wire.

<Si: 0.05 Mass % or More and 0.55 Mass % or Less>

Si is a component having a deoxidizing action and having an effect of improving the shape of a weld bead. The content of Si in the wire is appropriately controlled, so that a shape of a welding end portion can be formed into a smooth shape of the bead.

In addition, when an appropriate amount of Si is contained in the wire, the adhesiveness between a slag and a weld metal can be enhanced by the Si phase existing in the slag. As a result, rust prevention can also be improved. In addition, when the appropriate amount of Si is contained, the amount of spatter generated during welding is reduced. Therefore, the content of Si in the wire is 0.05 mass % or more based on the total mass of the wire, and since the spatter is likely to occur when the content of Si is small, the content of Si is preferably 0.10 mass % or more, more preferably 0.12 mass % or more, and still more preferably 0.15 mass %, based on the total mass of the wire.

On the other hand, if the content of Si in the wire is more than 0.55 mass %, a slag formed by combining Si with oxygen is likely to aggregate and a thickness of the slag is increased. Accordingly, an electrodeposition coating film is less likely to be formed on a surface of the slag, and coating defects are generated. Therefore, the content of Si in the wire is 0.55 mass % or less, preferably 0.40 mass % or less, more preferably 0.35 mass % or less, still more preferably 0.30 mass % or less, and even more preferably 0.25 mass % or less, based on the total mass of the wire.

<Mn: 1.60 Mass % or More and 2.40 Mass % or Less>

Mn is an important component for ensuring the desired strength of the weld metal. In the wire in the present embodiment, since each of the content of C and the content of Si in the wire is limited to the specific range in order to improve the workability and the rust prevention of a weld portion, it is necessary to appropriately control the content of Mn in order to obtain a sufficient strength of the weld metal. Since MnO has conductivity higher than $SiO_2$, a coating film is likely to be formed on the slag uniformly in the electrodeposition coating after welding when the content of MnO in the slag is high.

If the content of Mn in the wire is less than 1.60 mass %, it is difficult to obtain sufficient strength of the weld metal, and the effect of forming a coating film on the slag cannot be sufficiently obtained. Therefore, the content of Mn in the wire is 1.60 mass % or more, preferably 1.65 mass % or more, more preferably 1.70 mass % or more, and still more preferably 1.80 mass % or more, based on the total mass of the wire.

On the other hand, if the content of Mn in the wire is more than 2.40 mass %, the deoxidation proceeds excessively, and the amount of oxygen in a molten pool decreases. Accordingly, the viscosity and surface tension of the droplets becomes high, and the shape of the bead is impaired. Therefore, the content of Mn in the wire is 2.40 mass % or less, preferably 2.30 mass % or less, more preferably 2.20 mass % or less, and still more preferably 2.10 mass % or less, based on the total mass of the wire.

<Cu: 0.01 Mass % or More and 0.30 Mass % or Less>

Cu has an effect of improving the rust prevention of the wire, and in terms of the lower limit, the content of Cu is 0.01 mass % or more. The content of Cu in the wire is preferably 0.05 mass % or more, more preferably 0.10 mass % or more, and still more preferably 0.15 mass % or more, based on the total mass of the wire. On the other hand, if the content of Cu is more than 0.30 mass %, the required cracking resistance cannot be obtained. Therefore, the content of Cu in the wire is preferably 0.25 mass % or less, and more preferably 0.20 mass % or less.

<Ti: 0.05 Mass % or More and 0.25 Mass % or Less>

Ti is one of the most important elements in the wire in the present embodiment and is a component having a deoxidizing action and an action of changing the physical properties of the slag. Although the mechanism related to the effect of Ti is not always clear, the present inventors have found the tendency that when in a composite slag made of Si, Mn, and Ti, the wire contains an appropriate amount of Ti, the composite slag covered by Ti is formed. Such a slag not only has electrodeposition coatability but also has good adhesiveness between the slag and the base metal, so that corrosion hardly proceeds.

If the content of Ti in the wire is less than 0.05 mass %, it is difficult to obtain a desired state of the slag. Therefore, the content of Ti in the wire is 0.05 mass % or more, preferably 0.12 mass % or more, and more preferably 0.16 mass % or more, based on the total mass of the wire.

On the other hand, if the content of Ti in the wire is more than 0.25 mass %, the deoxidation proceeds excessively, and the slag generation amount is excessively large. Thus, the shape of the bead is deteriorated due to increase in thickness of the slag and the deoxidizing action that proceeds excessively. Therefore, the content of Ti in the wire is 0.25 mass % or less, preferably 0.23 mass % or less, and more preferably 0.21 mass % or less, based on the total mass of the wire.

<Al: 0.10 Mass % or Less (Including 0 Mass %)>

Al is a component having a deoxidizing action and having an action of changing the physical properties of the slag. Al is an element that reduces the adhesiveness of the slag since Al has an effect of aggregating the slag. Therefore, the content of Al in the wire is 0.10 mass % or less, preferably 0.05 mass % or less, and more preferably 0.03 mass % or less, based on the total mass of the wire. In the case where Al is contained, the content of Al is preferably 0.001 mass % or more.

<P: 0.025 Mass % or Less (Including 0 Mass %)>

P is an element that reduces the cracking resistance of the weld metal, and the smaller the content of P in the wire is, the more preferred it is.

If the content of P in the wire is more than 0.025 mass %, the required cracking resistance cannot be obtained. Therefore, the content of P in the wire is 0.025 mass % or less, preferably 0.020 mass % or less, more preferably 0.015 mass % or less, and still more preferably 0.010 mass % or less, based on the total mass of the wire.

<S: 0.001 Mass % or More and 0.020 Mass % or Less>

S is an element having an effect of aggregating the slag and improving the shape of the weld bead. For example, when the content of S in the wire is changed in a state where the amount of slag is constant, the slag aggregates to increase the thickness with an increase in the content of S, so that the smaller the content of S is, the more preferable for the electrodeposition coatability is. On the other hand, the larger the content of S is, the more preferable for the shape of the weld bead is.

If the content of S in the wire is less than 0.001 mass %, the shape of the weld bead is poor. Therefore, the content of S in the wire is 0.001 mass % or more, preferably 0.003 mass % or more, and more preferably 0.005 mass % or more, based on the total mass of the wire.

On the other hand, if the content of S in the wire is more than 0.020 mass %, it is difficult to uniformly form a thin slag on the weld metal, and there is a possibility that the electrodeposition coating film is not formed or is peeled off with the slag. Therefore, the content of S in the wire is 0.020 mass % or less, preferably 0.015 mass % or less, and more preferably 0.010 mass % or less, based on the total mass of the wire.

<N: 0.0045 Mass % or More and 0.0150 Mass % or Less>

N is an element having an effect of improving the strength of the weld metal, reducing the surface tension of the weld metal, and improving the shape of the bead. Further, N improves the strength of the weld metal and improves fatigue resistance. If the content of N in the wire is less than 0.0045 mass %, the strength of the weld metal decreases and the surface tension is too high, and thus the shape of the bead is deteriorated. If the content of N in the wire is more than 0.0150 mass %, the surface tension of the molten metal is too low, the amount of spatter increases, and the shape of the bead is deteriorated. Further, the slag adhesiveness also deteriorates. Therefore, the content of N in the wire is 0.0045 mass % or more, preferably 0.0047 mass % or more, and more preferably 0.0055 mass % or more. The content of N may be 0.0065 mass % or more, 0.0075 mass % or more, 0.0085 mass % or more, and 0.0095 mass % or more. In addition, the content of N in the wire is 0.0150 mass % or less, more preferably 0.0130 mass % or less, and still more preferably 0.0110 mass % or less.

<O: 0.0010 Mass % or More and 0.0050 Mass % or Less>

O is not an essential component in the wire in the present embodiment, but the content of O is preferably in a range of 0.0010 mass % or more and 0.0050 mass % or less since O is an element that affects the generation amount of the slag, and has an effect of reducing the surface tension and improving the shape of the bead. When the content of O in the wire is 0.0010 mass % or more, the shape of the bead is improved. When the content of O in the wire is 0.0050 mass % or less, the amount of the slag during welding can be reduced. Therefore, the content of O in the wire is preferably 0.0010 mass % or more, more preferably 0.0015 mass % or more, still more preferably 0.0020 mass % or more, and even more preferably 0.0030 mass % or more. In addition, the content of O in the wire is preferably 0.0050 mass % or less, and more preferably 0.0040 mass % or less.

<Cr: 0.001 Mass % or More and 0.10 Mass % or Less, Mo: 0.001 Mass % or More and 0.10 Mass % or Less>

Cr and Mo are not essential components in the wire of the present embodiment but may be contained in order to improve the strength. Either Cr or Mo may be contained in a range of Cr: 0.001 mass % or more and 0.10 mass % or less, or Mo: 0.001 mass % or more and 0.10 mass % or less. Both Cr and Mo may be contained in a range of Cr: 0.001 mass % or more and 0.10 mass % or less, and Mo: 0.001 mass % or more and 0.10 mass % or less.

<Remainder>

The remainder of the wire in the present embodiment is Fe and inevitable impurities. Examples of the inevitable impurities include Zr, Ni, Co, Li, Sn, Sb, Bi, B, As and the like.

Further, the wire in the present embodiment may contain Ni, Co, B, and/or Sb in a range of Ni≤0.10 mass %, Co≤0.10 mass %, B≤0.01 mass %, and Sb≤0.01 mass %.

<0.1≤[Ti]/[Si]≤3.0>

A distribution state of the slag can be controlled by appropriately controlling the ratio of the content of Ti to the content of Si in the wire. When the generation of the slag in the molten pool during welding is observed, a state where a large number of fine slags are generated is observed. Therefore, a thin slag is assumed to be spread on the weld metal when the ratio of the content of Ti to the content of Si is appropriately controlled.

In the case where the content of Si (mass %) based on the total mass of the wire is defined as [Si] and the content of Ti (mass %) based on the total mass of the wire is defined as [Ti], when the content of Si increases relative to the content of Ti, and the value obtained by the following formula (1) is less than 0.1, there is a possibility that the slag aggregates and the electrodeposition coating film is not formed or is peeled with the slag. Therefore, in order to reduce the thickness of the slag, it is necessary to set the value obtained by the following formula (1) to 0.1 or more, preferably 0.4 or more, and more preferably 1.0 or more.

On the other hand, when the content of Ti is increased relative to the content of Si and the value obtained by the following formula (1) is more than 3.0, the generation amount of the slag is excessively increased, the thickness of slag is increased, and the shape of the bead is deteriorated. Therefore, the value obtained by the following formula (1) is required to be 3.0 or less, preferably 2.8 or less, and more preferably 2.5 or less.

$$[Ti]/[Si] \tag{1}$$

<0.7≤(1000×[S]×[O])/([S]+0.3×[N]+0.5[O])≤3.0>

S, N, and O in the wire have an effect of decreasing the surface tension and improving the shape of the bead. However, since S aggregates the slag and O causes the amount of the slag to increase, it has been found that excessive addition of S or O may cause the electrodeposition coatability to deteriorate. As a result of intensive studies, the present inventors have found that a parameter whose variable is the contents of S, N, and O is controlled within the specific range, so that the shape of the bead can be more improved while maintaining good electrodeposition coatability. In the case where the content of S (mass %) based on the total mass of the wire is defined as [S], the content of O (mass %) based on the total mass of the wire is defined as [O], and the content of N (mass %) based on the total mass of the wire is defined as [N], when the value obtained by the following formula (2) is 0.7 or more and 3.0 or less, the electrodeposition coatability and the shape of the bead can be further improved. The value obtained by the following formula (2) is more preferably 1.0 or more. The value obtained by the following formula (2) is more preferably 2.5 or less.

$$(1000\times[S]\times[O])/([S]+0.3\times[N]+0.5\times[O]) \tag{2}$$

<([Si]+[Ti]/3)/([C]/2+2×[Al])≥3>

The amount of spatter generated during welding can be reduced by appropriately controlling a ratio of the content of Si and content of Ti to the content of C and content of Al in the wire. For example, when the droplet transfer behavior during pulsed arc welding was observed, a state where the detachment of the droplets was not satisfactory to cause a short circuit when the viscosity is too low, or a state where spatter was generated from the molten pool itself was observed. When the ratio of the content of Si and content of Ti to the content of C and content of Al is appropriately controlled, it is assumed that the droplets are easily detached and the amount of spatter is reduced by preventing an excessive decrease in the viscosity.

In the case where the content of Si (mass %) based on the total mass of the wire is defined as [Si], the content of Ti (mass %) based on the total mass of the wire is defined as [Ti], the content of C (mass %) is defined as [C], and the content of Al (mass %) based on the total mass of the wire is defined as [Al], when a value obtained by the following formula (3) is 3 or more, the droplet detachment is good, the number of short circuits is appropriately maintained, and the welding with less spatter can be performed. Therefore, the value obtained by the following formula (3) is preferably 3 or more, more preferably 7 or more, and still more preferably 10 or more.

$$([Si]+[Ti]/3)/([C]/2+2\times[Al]) \tag{3}$$

<Shielding Gas: Ar—CO$_2$ Mixed Gas>

In the case where welding is performed using the wire in the present embodiment, for example, Ar—CO$_2$ mixed gas can be used as the shielding gas. When the Ar—CO$_2$ mixed gas is used, the amount of the slag generated by oxidation decreases since the amount of oxygen contained in the shielding gas is small. As the ratio of the Ar—CO$_2$ mixed gas, for example, 80 vol % of Ar-20 vol % of CO$_2$ mixed gas or the like may be used.

The welding posture using the wire in the present embodiment is not particularly limited. Further, the size (diameter) of the wire in the present embodiment is not particularly limited, and a wire having a diameter defined in accordance with a welding material standard such as AWS or JIS may be used.

<Production of Wire>

When the wire in the present embodiment is produced, the wire can be produced by a usual method without requiring a special production condition. For example, steel having the above components is melted to obtain an ingot. The ingot is subjected to hot forging or the like as necessary, and then hot rolling is performed and further cold drawing is performed to form a wire. The wire is annealed at a temperature of about 500° C. to 900° C. as necessary, subjected to copper plating after pickling, and further subjected to finishing drawing as necessary to have a target wire diameter. Thereafter, a lubricant is applied, as necessary, to form a wire for welding.

Examples

Hereinafter, the effects of the present invention are specifically described with reference to Invention Examples and Comparative Examples, but the present invention is not limited thereto.

[Production of Wire]

A wire for the gas-shielded arc welding having a wire diameter of 1.2 mm was produced so as to have the contents of various chemical components in the wire, as shown in Table 1.

[Gas-Shielded Arc Welding]

Figure 2:
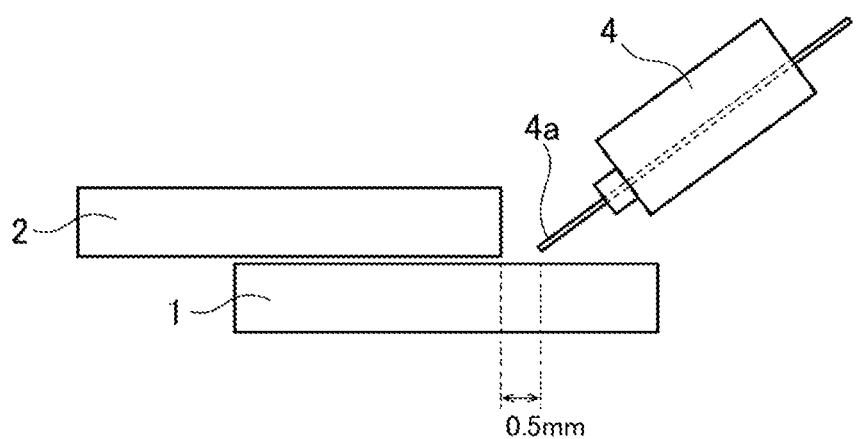
FIG. 2 is a side view showing conditions of the gas-shielded arc welding.

FIG. 1 is a perspective view showing conditions of the gas-shielded arc welding using wires in Invention Examples and Comparative Examples, and FIG. 2 is a side view thereof. Two plate-shaped steel sheets 1, 2 each having a length of 150 mm, a width of 50 mm, and a thickness of 2.9 mm were stacked so as to be shifted by 20 mm in a width direction (route interval: 0 mm) horizontally, and a fillet portion which was formed between an upper surface of the lower steel sheet 1 and a side surface of the upper steel sheet 2 was subjected to horizontal fillet welding that was performed under the welding conditions shown in Table 2 below by using each of the wire for gas-shielded arc welding in Invention Examples and Comparative Examples.

The welding started at a position that was 15 mm away from one ends of the steel sheets 1, 2 in a longitudinal direction, the welding proceeded in a direction of an arrow A at a distance of 120 mm, and then welding was ended at a position that was on the opposite side to the welding start position and was 15 mm away from the other ends of the steel sheets 1, 2 in the longitudinal direction, thereby forming a weld metal 3. As shown in FIG. 2, an angle of a welding torch 4 was 45° relative to a direction vertical to the steel sheet 1, and a target position of a wire 4a was about 0.5 mm away from an end surface of the steel sheet 2 in the width direction.

[Evaluation of Wire]

<<Slag Adhesiveness>>

The slag adhesiveness was evaluated by beating, with a steel chisel, a surface of the weld metal after welding, and inspecting whether the slag fell. The slag adhesiveness was evaluated as A (good) in the case where the slag did not fall off from the surface of the weld metal, and was evaluated as B (poor) in the case where the slag was easily peeled off and fell off.

<<Rust Prevention>>

A coating film was formed by the electrodeposition coating on a surface of a bonding member obtained by the welding, and then a cycle corrosion test was carried out in accordance with JIS K 5600-7-9 (2006) to evaluate the rust prevention as an index of the electrodeposition coatability. The rust prevention was evaluated as A (good) in the case where an area proportion of rust generated on the weld bead was 0% or more and less than 20% after 30 cycles of cycle corrosion tests, and was evaluated as B (poor) in the case where the area proportion of the rust was 20% or more. Some of the test pieces were not subjected to the cycle corrosion test, and the case where a thin slag was spread on the weld metal and the electrodeposition coatability was good was evaluated as A (good), and the case where the slag aggregated on the weld metal and the electrodeposition coatability was deteriorated was evaluated as B (poor).

<<Shape of Bead>>

A cross section of the produced fillet weld portion was embedded in a resin, and a welded end portion on the lower sheet side was observed. The observation was performed at a magnification of 50 times. The case where the shape was particularly smooth was evaluated as "A", the case where the shape was smooth was evaluated as "B", and the case where the shape was poor was evaluated as "C".

<<Strength>>

A weld metal was prepared for each wire, and a tensile strength (MPa) was determined by measuring a tensile load. The tensile test of the total weld metal was carried out by taking a tensile test piece AO from a center of a test sheet, in accordance with JISZ3111:2015.

<<Small Amount of Spatter>>

As a result of a sensory evaluation during pulsed arc welding, the case of particularly small amount of spatter was evaluated as "A", the case of small amount of spatter was evaluated as "B", the case of slightly small amount of spatter was evaluated as "C", and the case of many short circuits and large amount of spatter was evaluated as "D" (poor).

The chemical components of each wire and evaluation results of each test are shown together in Table 1 below. The remainder of the chemical components of the wire is Fe and inevitable impurities, and the amount of each component in the wire is indicated by a content (mass %) relative to the total mass of the wire. In Table 1, the formula (1) is [Ti]/[Si], the formula (2) is $(1000\times[S]\times[O])/([S]+0.3\times[N]+0.5\times[O])$, and the formula (3) is $([Si]+[Ti]/3)/([C]/2+2\times[Al])$. In Table 1, "-" in the columns of Cr and Mo means that the content thereof is less than 0.01 mass %. Further, in the columns of the evaluation results, "-" means that the evaluation is not performed.

TABLE 1

| | Wire No. | Chemical components of wire (mass %, remainder: Fe and inevitable impurities) | | | | | | | | | | | |
|---|---|---|---|---|---|---|---|---|---|---|---|---|---|
| | | C | Si | Mn | P | S | Cu | Ti | Al | Cr | Mo | N | O |
| Invention Example | 1 | 0.04 | 0.09 | 2.00 | 0.007 | 0.007 | 0.25 | 0.20 | 0.012 | 0.04 | — | 0.0056 | 0.0023 |
| | 2 | 0.04 | 0.07 | 1.98 | 0.004 | 0.004 | 0.25 | 0.20 | 0.012 | 0.04 | — | 0.0055 | 0.0023 |
| | 3 | 0.04 | 0.08 | 2.03 | 0.005 | 0.006 | 0.25 | 0.20 | 0.012 | 0.04 | — | 0.0051 | 0.0023 |
| | 4 | 0.04 | 0.08 | 2.02 | 0.004 | 0.005 | 0.25 | 0.20 | 0.012 | 0.04 | — | 0.0054 | 0.0023 |
| | 5 | 0.04 | 0.07 | 1.99 | 0.005 | 0.006 | 0.25 | 0.20 | 0.012 | 0.04 | — | 0.0055 | 0.0023 |
| | 6 | 0.05 | 0.10 | 2.10 | 0.008 | 0.003 | 0.17 | 0.20 | 0.017 | — | — | 0.0079 | 0.0045 |
| | 7 | 0.05 | 0.12 | 2.15 | 0.008 | 0.003 | 0.17 | 0.19 | 0.016 | — | — | 0.010 | 0.0048 |
| | 8 | 0.06 | 0.41 | 1.94 | 0.007 | 0.001 | 0.22 | 0.07 | 0.004 | 0.03 | — | 0.0045 | 0.0020 |
| | 9 | 0.05 | 0.10 | 1.97 | 0.006 | 0.003 | 0.24 | 0.21 | 0.012 | 0.04 | 0.01 | 0.0047 | 0.0026 |
| | 10 | 0.05 | 0.09 | 2.02 | 0.006 | 0.003 | 0.24 | 0.23 | 0.012 | 0.04 | — | 0.0047 | 0.0021 |
| | 11 | 0.04 | 0.12 | 2.10 | 0.007 | 0.003 | 0.18 | 0.16 | 0.015 | — | — | 0.015 | 0.0020 |
| Comparative Example | 12 | 0.05 | 0.11 | 1.84 | 0.009 | 0.004 | 0.24 | 0.19 | 0.015 | 0.04 | — | 0.0041 | 0.0033 |
| | 13 | 0.05 | 0.23 | 1.92 | 0.015 | 0.006 | 0.17 | 0.19 | 0.001 | — | — | 0.0020 | 0.0110 |
| | 14 | 0.05 | 0.61 | 1.92 | 0.015 | 0.006 | 0.17 | 0.19 | 0.001 | — | — | 0.0019 | 0.0085 |
| | 15 | 0.05 | 0.40 | 1.93 | 0.012 | 0.007 | 0.16 | 0.03 | 0.001 | — | — | 0.0028 | 0.0076 |

TABLE 1-continued

| | | | | | | | | | | | | |
|---|---|---|---|---|---|---|---|---|---|---|---|---|
| 16 | 0.10 | 0.07 | 1.87 | 0.011 | 0.003 | 0.18 | 0.21 | 0.001 | — | 0.24 | 0.0018 | 0.0075 |
| 17 | 0.05 | 0.03 | 1.93 | 0.015 | 0.003 | 0.24 | 0.08 | 0.001 | — | — | 0.0026 | 0.0022 |
| 18 | 0.05 | 0.06 | 1.86 | 0.010 | 0.002 | 0.18 | 0.20 | 0.011 | — | — | 0.0034 | 0.0097 |
| 19 | 0.05 | 0.31 | 1.36 | 0.011 | 0.005 | 0.24 | 0.01 | 0.008 | 0.45 | — | 0.0046 | 0.0025 |
| 20 | 0.06 | 0.59 | 1.19 | 0.010 | 0.011 | 0.24 | 0.06 | 0.004 | — | — | 0.0036 | 0.0025 |
| 21 | 0.05 | 0.55 | 1.09 | 0.005 | 0.009 | 0.26 | 0.001 | 0.002 | 1.38 | 0.53 | 0.010 | 0.0030 |
| 22 | 0.06 | 0.12 | 2.15 | 0.007 | 0.002 | 0.18 | 0.19 | 0.015 | — | — | 0.040 | 0.0048 |
| 23 | 0.05 | 0.12 | 2.06 | 0.007 | 0.002 | 0.18 | 0.13 | 0.008 | — | — | 0.018 | 0.0020 |

| | Wire No. | Formula (1) | Formula (2) | Formula (3) | Evaluation results | | | | |
|---|---|---|---|---|---|---|---|---|---|
| | | | | | Slag adhesiveness | Rust prevention | Shape of bead | Strength (MPa) | Small amount of spatter |
| Invention Example | 1 | 2.22 | 1.64 | 3.56 | A | A | A | 606 | B |
| | 2 | 2.86 | 1.35 | 3.11 | A | A | A | — | B |
| | 3 | 2.50 | 1.59 | 3.33 | A | A | A | — | B |
| | 4 | 2.50 | 1.48 | 3.33 | A | A | A | — | B |
| | 5 | 2.86 | 1.57 | 3.11 | A | A | A | — | B |
| | 6 | 2.00 | 1.77 | 2.82 | A | A | A | — | C |
| | 7 | 1.58 | 1.71 | 3.22 | A | A | A | 633 | B |
| | 8 | 0.17 | 0.60 | 11.40 | A | A | B | 658 | A |
| | 9 | 2.10 | 1.37 | 3.47 | A | A | A | 601 | B |
| | 10 | 2.56 | 1.15 | 3.40 | A | A | A | — | B |
| | 11 | 1.33 | 0.71 | 3.47 | A | A | B | 633 | B |
| Comparative Example | 12 | 1.73 | 1.92 | 3.15 | A | A | C | 588 | B |
| | 13 | 0.83 | 5.45 | 10.86 | A | A | C | — | — |
| | 14 | 0.31 | 4.71 | 24.94 | B | B | B | — | — |
| | 15 | 0.08 | 4.57 | 15.19 | A | B | B | — | — |
| | 16 | 3.00 | 3.09 | 2.69 | A | A | C | 562 | C |
| | 17 | 2.67 | 1.35 | 2.10 | A | A | C | — | D |
| | 18 | 3.33 | 2.47 | 2.70 | A | B | C | 584 | — |
| | 19 | 0.03 | 1.64 | 7.64 | A | B | A | 510 | — |
| | 20 | 0.10 | 2.06 | 16.05 | B | B | B | 521 | — |
| | 21 | 1.00 | 2.00 | 18.98 | B | B | A | 770 | — |
| | 22 | 1.58 | 0.59 | 3.06 | B | A | C | — | — |
| | 23 | 1.08 | 0.48 | 3.98 | B | A | C | 616 | B |

Formula (1): $[Ti]/[Si]$,
Formula (2): $(1000 \times [S] \times [O])/([S] + 0.3 \times [N] + 0.5 \times [O])$,
Formula (3): $([Si] + [Ti]/3)/([C]/2 + 2 \times [Al])$

TABLE 2

| | |
|---|---|
| Welding mode | Pulsed arc MAG welding |
| Welding current | 200 A to 210 A |
| Arc voltage | 24 V |
| Travel speed | 800 mm/min |
| Electrode extension | 15 mm |
| Shielding gas composition | 80 vol % of Ar-20 vol % of $CO_2$ |
| Shielding gas flow rate | 25 L/min |

As shown in Table 1 above, regarding wire No. 1 to No. 11 that were Invention Examples, the components of the wires and the values obtained by the formula (1) were within the range of the present invention, the amount of spatter generated during welding was small. In addition, in these Invention Examples, the slag adhesiveness is good, an electrodeposition coating film could be formed in a good state without removing the slag, and as a result, excellent rust prevention could be obtained.

In contrast, regarding the wire No. 12 that was Comparative Example, the content of N in the wire was less than the lower limit of the range of the present invention, and thus the shape of the bead was poor and the strength was low.

Regarding the wire No. 13 and No. 16 that were Comparative Examples, the content of N in the wire was less than the lower limit of the range of the present invention, and thus the shape of the bead was poor. In addition, the wire No. 16 whose strength was measured showed a low strength.

Regarding the wire No. 14 that was Comparative Example, the content of Si in the wire was more than the upper limit of the range of the present invention, and the content of N was less than the lower limit of the range of the present invention, and thus the slag adhesiveness was low, which resulted in poor rust prevention.

Regarding the wire No. 15 that was Comparative Example, each of the content of Ti and the content of N in the wire, and the value of the formula (1) was less than the lower limit of the range of the present invention, and thus the rust prevention was poor.

Regarding the wire No. 17 that was Comparative Example, the content of Si and the content of N in the wire were less than the lower limit of the range of the present invention, and thus the amount of spatter generation was large and the shape of the bead was poor.

Regarding the wire No. 18 that was Comparative Example, the content of N in the wire was less than the lower limit of the range of the present invention, and the value of the formula (1) was more than the upper limit of the range of the present invention. Therefore, the thickness of slag was large, the rust prevention was poor, the shape of the bead was poor, and the strength was low.

Regarding the wire No. 19 that was Comparative Example, each of the content of Mn and the content of Ti in the wire, and the value of the formula (1) was less than the lower limit of the range of the present invention, and thus the rust prevention was poor and the strength was low.

Regarding the wire No. 20 that was Comparative Example, the content of Si in the wire was more than the upper limit of the range of the present invention, and each of the content of Mn and the content of N was less than the lower limit of the range of the present invention. Therefore, the slag adhesiveness was low, the rust prevention was poor, and the strength was low.

Regarding the wire No. 21 that was Comparative Example, each of the content of Mn and the content of Ti in the wire, and the value of the formula (1) were less than the lower limit of the range of the present invention, and thus the slag adhesiveness was low and the rust prevention was poor.

Regarding the wire No. 22 and No. 23 that were Comparative Examples, the content of N in the wire was more than the upper limit of the range of the present invention, and thus the shape of the bead was poor and the slag adhesiveness was low.

As described in detail above, by using the wire for gas-shielded arc welding in the embodiment of the present invention, the amount of spatter generated during welding is small, and a step such as removal of the slag after welding is unnecessary, and a weld portion having excellent electrodeposition coatability and a good shape of the bead can be obtained.

REFERENCE SIGNS LIST 1,2: Steel sheet
3: Weld metal
4: Welding torch
4a: Wire

The invention claimed is:

1. A wire for gas-shielded arc welding, consisting of, based on a total mass of the wire:
C: 0.01 mass % or more and 0.10 mass % or less;
Si: 0.05 mass % or more and 0.55 mass % or less;
Mn: 1.60 mass % or more and 2.40 mass % or less;
Ti: 0.05 mass % or more and 0.25 mass % or less;
Cu: 0.01 mass % or more and 0.30 mass % or less;
S: 0.001 mass % or more and 0.020 mass % or less;
N: 0.0045 mass % or more and 0.0150 mass % or less;
Al: 0.10 mass % or less; and
P: 0.025 mass % or less,
and optionally at least one of Cr: 0.10 mass % or less and Mo: 0.10 mass % or less,
with the remainder being Fe and inevitable impurities,
wherein the following relationship is satisfied:

$$0.1 \leq [Ti]/[Si] \leq 3.0$$

wherein [Si] is the content of Si (mass %) based on the total mass of the wire and [Ti] is the content of Ti (mass %) based on the total mass of the wire.

2. The wire for gas-shielded arc welding according to claim 1, wherein the content of Si is 0.25 mass % or less.

3. The wire for gas-shielded arc welding according to claim 2, wherein the content of Ti is 0.12 mass % or more.

4. The wire for gas-shielded arc welding according to claim 2, further comprising at least one of Cr: 0.10 mass % or less and Mo: 0.10 mass % or less.

5. The wire for gas-shielded arc welding according to claim 2, wherein the following relationship is satisfied:

$$([Si]+[Ti]/3)/([C]/2+2\times[Al]) \geq 3$$

wherein [C] is the content of C (mass %) based on the total mass of the wire and [Al] is the content of Al (mass %) based on the total mass of the wire.

6. The wire for gas-shielded arc welding according to claim 1, wherein the content of Ti is 0.12 mass % or more.

7. The wire for gas-shielded arc welding according to claim 1, further comprising at least one of Cr: 0.10 mass % or less and Mo: 0.10 mass % or less.

8. The wire for gas-shielded arc welding according to claim 1, wherein the following relationship is satisfied:

$$([Si]+[Ti]/3)/([C]/2+2\times[Al]) \geq 3$$

wherein [C] is the content of C (mass %) based on the total mass of the wire and [Al] is the content of Al (mass %) based on the total mass of the wire.

* * * * *